June 18, 1935.  G. WAGNER  2,005,702
PISTON
Filed Aug. 12, 1933
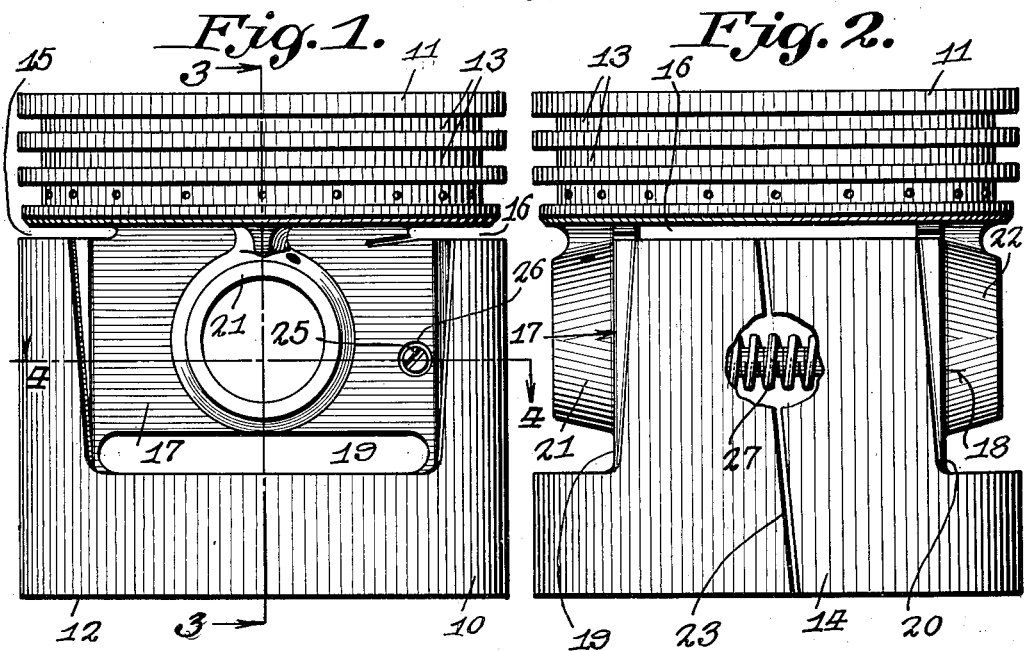
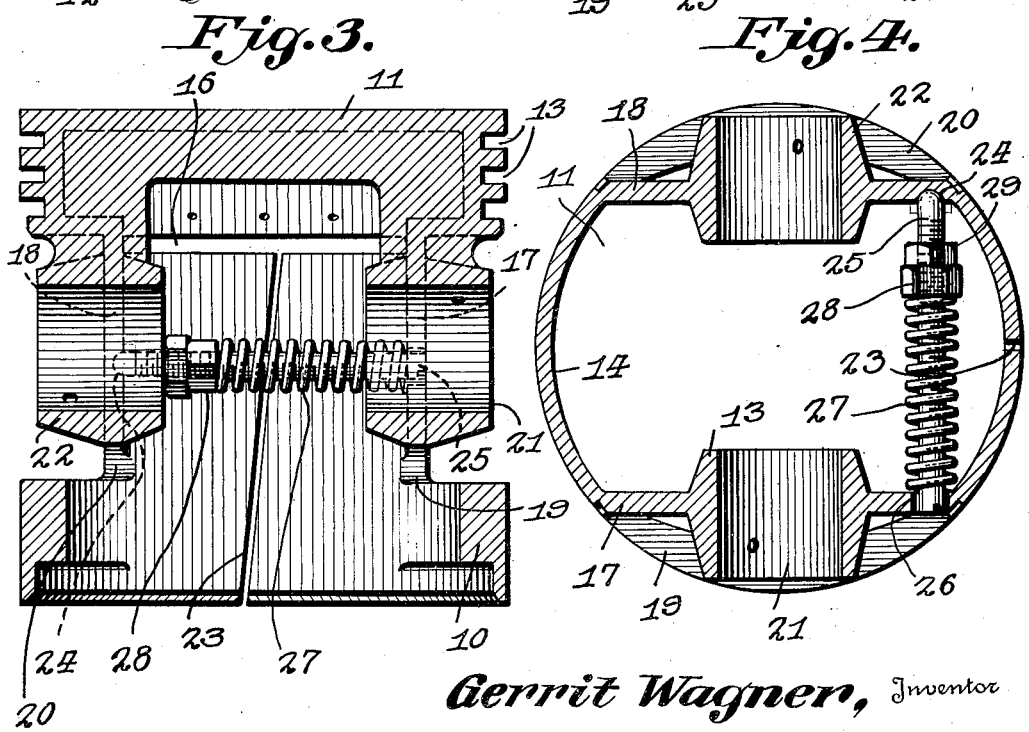
Gerrit Wagner, Inventor
Attorney Patented June 18, 1935

2,005,702

UNITED STATES PATENT OFFICE 2,005,702

PISTON

Gerritt Wagner, Orange City, Iowa

Application August 12, 1933, Serial No. 684,905

1 Claim. (Cl. 309—12)

This invention relates to improvements in engine pistons and particularly to pistons such as are used in explosive engines. The principal object is to provide a piston of this type having an expansible skirt which will automatically enlarge as the bore of the cylinder, in which it functions, increases, due to wear.

Another object is to provide adjustable means for varying the resiliency of the piston skirt.

A still further object is to provide a piston of the type mentioned having a skirt so constructed as to automatically adjust itself to a cylinder having a bore of varying diameter.

In the drawing:—

Figure 1 is an elevation of a piston made in accordance with my invention.

Figure 2 is a similar view but taken at a right angle to Figure 1.

Figure 3 is a vertical section on the line 3—3 of Figure 1, and

Figure 4 is a horizontal section on the line 4—4 of Figure 1.

This invention may be embodied in any of the various forms of engine pistons of the hollow type, now in general use, a typical form of such piston being illustrated in the drawing, with the present invention applied thereto.

As illustrated, the piston proper comprises a hollow cylindrical body 10, having a closed end forming a head portion 11 and an open end 12. The head portion is provided with the usual ring grooves 13, and that portion of the body between the said grooves and the open end 12 comprises the skirt 14. This skirt is slotted at diametrically opposite points and immediately below the head portion 11, as shown at 15 and 16, and that portion of the skirt between the ends of these slots, and at opposite sides of the body, is flattened as shown at 17 and 18. These flattened portions extend downwardly of the pistons as far as the slots 19 and 20, that portion of the skirt below these slots 19 and 20 being circular.

Formed upon and extending both inwardly and outwardly of the flattened portions 17 and 18 are bosses 21 and 22, which are bored through to receive the usual wrist pin.

In order to permit of expansion and contraction of the skirt 14, of the piston, the same is longitudinally slotted at one side, midway of the bosses 21 and 22, as at 23, the slot extending from the slot 16 to the bottom of the skirt.

Formed in the inner face of the flattened portion 18, and substantially midway of the ends of the piston is a recess 24 which receives the rounded end of a screw 25, the slotted head of which rests in an opening 26 through the flattened portion 17 and in line with the recess 24. Surrounding this screw is a coil spring 27 having one end leaning against the inner face of the said flattened portion 17 and the other resting against an adjusting nut 28, threaded onto the screw. Also on the screw 25 is a jamb nut 29 adapted to engage the nut 28 to prevent accidental rotation thereof.

It will be noted that the ends of the slots 15 and 16 extend into the flattened portions 17 and 18 to a slight degree and the extension is greater with respect to the latter. This is to facilitate the movement of those portions of the skirt between the slot 23 and the adjacent edges of the flat portions 17 and 18, in a manner now to be described.

The operation of the invention is as follows:

During the operation of an engine of the type in connection with which the present invention is intended for use, the diameter of the cylinders will gradually increase, due to wear, so that, in the past, it has been necessary for the cylinders to be fitted with larger pistons. This, however, is not necessary if pistons embodying the present invention are employed, as the same, when properly adjusted, will automatically expand so as to compensate for the cylinder wear. To cause expansion of the present piston, the nut 28 is held against rotation with a wrench or other suitable instrument, the nut 29 being out of engagement therewith. The screw 25 is then turned by means of a suitable screw driver so as to cause the nut 28 to progress towards the screw head. This manipulation compresses the spring 27 between the said nut 28 and the flattened portion 17 of the piston so as to cause a spreading of the skirt at opposite sides of the slot 23, with a consequent enlargement of the piston's circumference. The jamb nut 29 is then moved into contact with the nut 28 in the usual manner. As the bore of the cylinder becomes worn, the tension of the spring 27 may be correspondingly increased, from time to time, if found necessary.

The greatest wear of the inner face of the cylinder takes place at that portion which is engaged by the piston rings, resulting in different diameters within the cylinder. It has been found that the present piston will readily contract and expand to compensate for this difference in diameter when used as a replacement. Under such conditions, the adjustment should be made according to the greater cylinder diameter, as will be understood. Once properly adjusted, the piston will automatically adjust itself to a perfect fit within the cylinder. As the greatest pressure of the piston against the cylinder will be where the bore is the smallest, the wear there will be greatest, so that continued use will tend to restore a uniform bore.

It will be noted that the inner end of the screw 25 is not threaded into the wall of the piston, and that the outer end is merely supported therein, for rotation, so that the said screw does not, in any way, retard or limit the expansion and contraction of the piston.

What is claimed is:

A piston having a wall including separable resilient portions, one of said portions being perforated and the other having a recess in its inner face, a screw having an end mounted for rotation in said recess and a grooved end mounted for reciprocation and rotation in said perforation, a nut threaded upon the screw and a spring surrounding the screw and having an end bearing against the nut and an end bearing against the perforated face of a resilient portion.

GERRITT WAGNER.